United States Patent [19]

Gaus

[11] 4,347,453
[45] Aug. 31, 1982

[54] DIRECT CURRENT MOTOR WITH MAGNETIC COUPLING

[76] Inventor: Ernst Gaus, Bürgerstrasse 9, 7500 Karlsruhe, Fed. Rep. of Germany

[21] Appl. No.: 118,983

[22] Filed: Feb. 6, 1980

[51] Int. Cl.³ .......................................... H02K 49/00
[52] U.S. Cl. .................................. 310/104; 310/105; 310/114; 310/232; 310/233
[58] Field of Search ................. 310/46, 156, 103–110, 310/128, 129, 148, 232, 233, 219, 220, 221, 222, 112, 177, 114, 92–102 R, 102 A

[56] References Cited

U.S. PATENT DOCUMENTS

| | | | |
|---|---|---|---|
| 2,747,116 | 5/1956 | Poole | 310/128 |
| 3,080,495 | 5/1963 | Sudmeier | 310/104 |
| 3,411,450 | 11/1968 | Clifton | 310/104 |
| 3,937,993 | 2/1976 | Noodleman | 310/46 |
| 4,163,164 | 7/1979 | Pieters | 310/103 |

Primary Examiner—R. Skudy
Attorney, Agent, or Firm—Max Fogiel

[57] ABSTRACT

A direct-current motor has a housing in which a stator and a rotor are mounted. A commutator is located in the housing but spaced from the stator and the rotor and subdivided from the same by a transverse housing wall. A magnetic coupling having two relatively rotatable elements is mounted in the housing extending through the transverse wall and the two elements define with one another an air gap in which a hood-like partition is located which is sealingly connected with the transverse wall so that the commutator is sealingly separated from the stator and rotor but is driven by one of the parts of the magnetic coupling which in turn is magnetically driven by the other part of the coupling that receives torque from the shaft of the motor.

13 Claims, 2 Drawing Figures

DIRECT CURRENT MOTOR WITH MAGNETIC COUPLING

BACKGROUND OF THE INVENTION

This invention relates to a direct-current motor, and more specifically to a direct-current motor which is particularly—but not exclusively—suited for driving compressors in refrigeration systems or aggregates.

Direct-current motors are often desired to be used because of their advantageous torque and their start-up characteristics. A particular application where such motors would be desirable is for driving compressors of refrigeration aggregates for mobile applications, such as in vehicles, boats or the like. Such vehicles and similar devices usually have a direct-current power supply from which the motor could be powered. However, when direct-current motors are used in such applications it is necessary in many instances to take relatively cumbersome and expensive steps to provide protection against disadvantageous influences resulting from spark formation between the brushes and the collector of the motor commutator. For example, if such a motor is used for driving a compressor of a refrigeration aggregate, the formation of sparks may lead to a deterioration of the cooling medium and to the formation of highly aggressive substances which can attack and cause damge to the entire system.

Nevertheless, the advantages of direct-current motors for the types of applications mentioned above are so significant that it has been proposed to provide for torque-transfer by means of contact-less couplings with a separator between the coupling sections, one of which is driven by the armature of the motor and the other of which is driven by the coupling and in turn drives the device to be powered, e.g. the refrigeration compressor, so that the component of the system which requires protection against sparking is separated from the source of the sparking. However, experience has shown that this construction is very expensive, and, moreover, is capable of transmitting only a relatively low torque which does not meet all requirements.

SUMMARY OF THE INVENTION

Accordingly, it is a general object of this invention to avoid the disadvantages of the prior art in providing an improved direct-current motor.

More particularly, it is an object of the invention to provide an improved direct-current motor in which a direct drive connection can be established between a component to be powered—e.g. a refrigeration compressor or the like—which must be protected against exposure to the formation of electrical sparks, and the motor armature without thereby exposing the aforementioned component to the danger of damage due to sparking.

Another object of the invention is to provide such a direct-current motor in which the torque which can be transmitted is not limited by the type of coupling known from the prior art.

In keeping with the above objects, and with still others which will become apparent hereafter, one feature of the invention resides in a direct-current motor, particularly well suited for driving compressors in refrigeration aggregates, which comprises a housing, a stator in the housing, and a rotor in the housing concentrically surrounded by the stator and defining an annular clearance therewith. Commutator means is also provided in the housing and a magnetic coupling is located in the housing intermediate the rotor and the commutator means for transmitting rotation to the latter. The coupling includes two magnetically coupled discrete rotatable elements one of which is driven by the rotor and the other of which in turn drives the commutator means. Furthermore, means is provided which hermetically subdivides the housing into two compartments one of which contains the rotor, the stator and one of the rotatable members of the coupling whereas the other compartment contains the commutator means and the other of the rotatable elements of the coupling.

In other words, the drive part of the motor, composed of the stator and the rotor, is hermetically sealed with reference to the commutator means and the drive for the necessary relative movement between the collector and the brushes of the commutator means is transmitted via a magnetic coupling between the rotary elements of which the hermetically sealing partition wall is arranged.

A clear distinction must be drawn between the present invention and the prior art. In the prior art a coupling was required which transmitted the full torque of the motor while the two halves or parts of the coupling were hermetically sealed off from one another; this imposed a strict and narrow limitation upon the magnitude of the torque that could be transmitted. In the motor according to the present invention only that amount of torque must be transmitted which is necessary for producing the relative movement between the collector and the brushes of the commutator, and this amount of torque—which needs to overcome only the friction in the area of the collector—is very small by comparison to the torque which must be transmitted to the component to be driven, so that even in the event of high-performance equipment there is no difficulty in hermetically sealing the drive part of the motor on the one hand from the commutator part on the other hand.

The drive part is defined herein as the stator and the rotor of the motor, as well as one half of the magnetic coupling. It has been found advantageous to hermetically seal this drive part from the other half of the magnetic coupling and the component to which torque is to be transmitted (e.g. a refrigeration compressor) by means of a housing wall through which at least one of the parts of the magnetic coupling (or the motor shaft connected with one of the parts of the coupling) extends, and to provide a partition which is located in the air gap between the magnetic poles of the two parts of the magnetic coupling, which partition is sealingly connected with this housing wall. Of course, other possibilities exist also, but this one has been found to be especially advantageous. A simple connection to establish a seal between the partition and the housing wall can be obtained by using a radial magnetic coupling with a partition in form of a separating hood located between the magnetic poles of the two coupling halves.

The magnetic coupling may be accommodated in a capsule or similar housing which is rigidly connected with the aforementioned housing wall. If this embodiment is chosen, then it is advantageous to provide the capsule with a hollow pin which extends on the side remote from the housing wall and to mount the collector of the commutator on this pin. Instead of this, however, the collector may be mounted on a journal pin which is connected with the capsule of the magnetic coupling against rotation and against axial movement, and this pin may in addition serve to journal that half of the magnetic coupling which is to drive the component to be driven, e.g. the refrigeration compressor.

It is also possible to mount the collector of the commutator fixedly, i.e. so that it cannot rotate, and to mount the brushes which are in pressure engagement with this collector on the driven half of the coupling so that they can rotate with this coupling half. Furthermore, slip rings may be connected with the driven half of the coupling and these, together with additional fixedly mounted brushes which co-operate with the slip rings, may provide for the electrical connection of the machine to a source of direct current. These slip rings may be mounted on a shaft which is fixedly connected with the driven coupling half and which is turnably journalled in the hollow pin of the coupling capsule. The slip rings could, however, also be mounted on the driven half of the magnetic coupling and concentrically surround this half.

The electrical conductors between the collector of the commutator and the field windings of the stator may be vacuum-tightly led through the housing wall. Another modification proposes for the major poles of the motor to be permanently excited magnets.

A particularly advantageous and important aspect of the invention is the use of the inventive direct-current motor as a drive for a refrigeration compressor. In such an application it is advantageous if the drive part of the motor, i.e. the rotor, the stator and the refrigeration compressor, are mounted in a capsule which is hermetically sealed with reference to any ambient atmosphere, whereas the commutator which is driven via the magnetic coupling is located outside this capsule. The wall of this capsule which is interrupted by the magnetic coupling constitutes the aforementioned housing wall between the drive part of the motor and the commutator. In such an embodiment it may be found to be advantageous to arrange the refrigeration compressor between the drive part of the motor and the commutator, so that a direct drive of the refrigeration compressor from the motor shaft can be realized in a most simple and advantageous manner.

The invention will hereafter be described with reference to two embodiments. It is to be understood, however, that these descriptions are purely exemplary in nature and that the scope of protection sought is defined exclusively in the appended claims.

DESCRIPTION OF PREFERRED EMBODIMENTS

Figure 1:
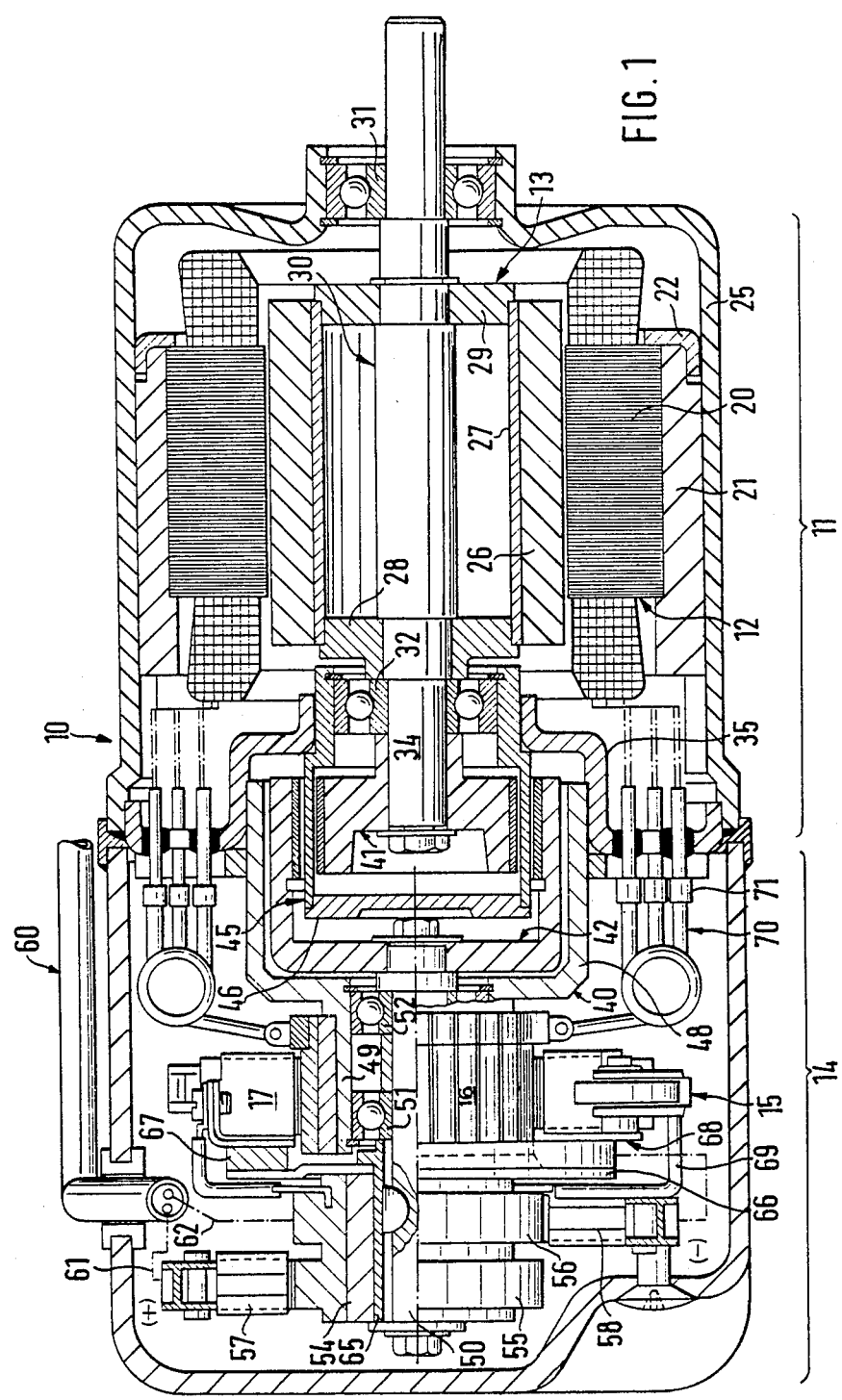
FIG. 1 is a longitudinal section through a first embodiment of a motor according to the present invention.

A first embodiment of the invention is illustrated in FIG. 1 wherein the direct-current motor 10 will be seen to have a drive part 11 including a stator 12 and a rotor 13, and a control part 14 having a commutator device 15 which is provided with a collector 16 and the cooperating brushes 17. Parts 11 and 14 are separate from one another and are hermetically sealed with reference to each other.

The stator 12 is fixedly mounted in the housing of the motor and provided with field windings 20 which are surrounded by a spacing sleeve 21 which is press-fitted into the housing 25; the field windings 20 are secured by means of retaining rings 22 which are press-fitted into the sleeve 21 and prevent the field windings or stator 12 from performing axial movements. The armature or rotor 13 is provided with permanent magnets 26 which are mounted on a sleeve 27. The latter is fixedly connected with the motor shaft 30 by means of hubs 28 and 29 which are mounted on the motor shaft 30 to rotate with but not relative to the same. The motor shaft 30 extends beyond the rotor 13 at opposite axial ends of the same and is journalled by means of the bearing 31 and another bearing 32, the latter being mounted in an intermediate housing wall 35.

A pin 34 of the motor shaft 30 extends beyond the bearing 32 of the housing wall 35 and the inner rotor or half 41 of a radial magnetic coupling 40 is connected with the pin 34 so that it can turn with the same. The driven coupling half 42 of the coupling 40 is connected with slip rings 55, 56 in such a manner that there can be no relative rotation of the driven coupling half 42 and the slip rings 55, 56 (the connection will be described below) and it is these slip rings which serve to supply current to the commutator 15 which will also be described below. Mounted in the air gap between the magnets of the two coupling halves 41 and 42 is a hood-shaped partition 45 of antimagnetic material which is connected with the housing wall 35 in a hermetic manner, i.e. to prevent the passage of gaseous or liquid fluids. At its side remote from the part 11 the hood 45 is provided with a cover 46 which, again, is connected to the hood in a sealing manner so as to prevent the passage of gaseous or liquid fluids.

Also connected with the housing wall 35 is a cup-shaped housing 48 which surrounds the driven coupling half 42 and has at its remote from the part 11 a projecting hollow pin 49. The housing 48 is rigidly connected with the housing wall 35. The collector 16 of the commutator 15 is mounted on the hollow pin 49, a sleeve 47 of electrically insulating material being interposed therebetween. A shaft 50 which is connected with the driven coupling half 42 (which in itself is of cup-shaped configuration) extends through the hollow pin 49 of the housing 48 at the side remote from the drive part 11 of the motor 10, and is journalled for rotation in the hollow pin 49 by means of two bearings 51 and 52. A portion of the shaft 50 extends beyond the bearings on the side which is remote from the radial coupling 40; mounted on this portion via an interposed sleeve 54 of electrically insulating material are two diagramatically shown slip rings 55 and 56 which can rotate with the shaft 50. The motor housing is provided with brush holders 57 and 58 in which brushes are mounted which cooperate with these slip rings 55 and 56. The brushes in turn are connected with a current supply cable 60 in the manner illustrated at 61 and 62 in diagrammatic broken-line form. That same section of the shaft 60 also mounts a sleeve 65 which is so provided on it that it rotates with the shaft, and on which in turn a disk 66 is mounted to rotate with the sleeve 65. The disk 66 is located between the slip rings 55, 56 and the collector 16. Brush holders 68 are fixedly mounted on the disk 66 via interposed spacers 67 of electrically insulating material, and brushes 17 are mounted in these brush holders which cooperate with the collector 16 of the commutator 15. These latter brushes 17 thus are connected for rotation with the section of the shaft 50 which carries the slip rings 55, 56 and thus can rotate with reference to the stationarily mounted collector. The torque for this purpose is provided by the radial magnetic coupling 40 which is interposed in the region of the housing wall 35 between the drive part 11 and the control part 14. The electrically conductive connection between a respective collector brush 17 and one of the slip rings 55, 56 is effected by bridges 69.

It will be seen that the collector 16 of the commutator 15 is electrically connected with the field windings 20 of the stators 12 via conductors 70; in known manner these conductors 70 are connected at 71 to the collector lamellae. Vacuum tight (i.e. completely sealed) pass-throughs 72 are arranged in the region of the housing wall 35 which separates the part 1 from the part 14, so that despite the necessity for passing the conductors 70 through the housing wall 35 a hermetic separation of the parts 11 and 14 from one another is assured.

The portion of the motor shaft 30 which extends on the side remote from the control part 14 beyond the journal 31 provides a connection to a component which is to be driven by means of the motor, e.g. a refrigeration compressor, which is not illustrated herein. Thus, the drive part 11 can be directly included in the working area of an aggregate to be driven.

Figure 2:
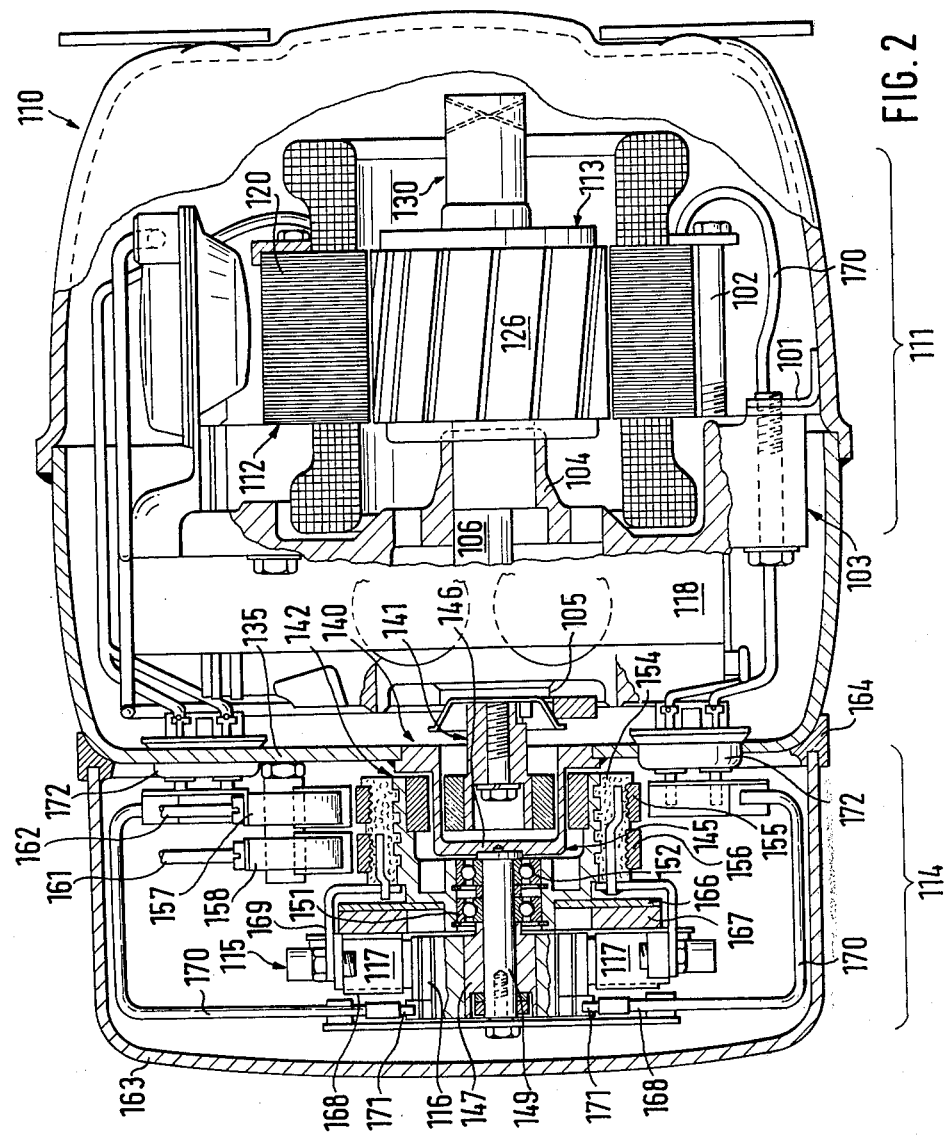
FIG. 2 is a sectional view analagous to the one in FIG. 1, but illustrating a second embodiment of the invention in which a refrigeration compressor is located between the drive part of the motor and the commutator and is driven directly by the motor shaft.

In the embodiment of FIG. 2 elements corresponding to those in FIG. 1 are identified with the same reference numerals, but increased by a power of 10.

The FIG. 2 embodiment differs in several respects from the one in FIG. 1. A major difference is the fact that the drive part 111 of the motor 110 is accommodated in a capsule or housing 125 together with the driven component (here a refrigeration compressor 118) which is driven directly by the motor shaft 130. The refrigeration compressor 118, which will not be described in more detail because it does not form a part of the invention and is known per se, is located between the drive part 111 and the control part 114. The compressor 118 is mounted (e.g. by screws or bolts) on consoles 101 within the capsule 125; the stator 112 of the motor is secured by means of screws 102 to the compressor housing 103. The motor shaft 130 is journalled in an extension 104 of the compressor housing and has a portion 105 which axially extends through the compressor. This portion 105 is provided with a crank pin 106 which provides for a direct compressor drive by acting directly upon the not illustrated aggregate or compressor piston or pistons.

The housing wall in the embodiment of FIG. 1 is identified with reference numeral 35. The corresponding housing wall in FIG. 2 is the wall 135 which closes off the capsule 125 with reference to the control part 114, i.e. that wall 135 beyond which (at the outside of which) there is located the control part 114 with the commutator 115. The driven connection between the motor shaft 130 and the commutator 115 is effected by means of a radial magnetic coupling 140 with a separating hood 145 which is located between the coupling halves 141 and 142. The coupling half 141 is rigidly connected with the portion 105 of the motor shaft 130 which extends through the compressor 118. The coupling half 145 is fixedly and seal-tightly mounted in the wall 145. A journal pin 149 is connected with the bottom wall 146 of the hood 145 so as to be aligned with the axis of rotation of the motor shaft 130; the driven coupling half 142 is turnably but axially immovably journalled on this pin 149 by means of bearings 151 and 152. Also mounted on the pin 149 is the collector 116, namely by means of a sleeve 147 of electrically insulating material. The collector 116 is not turnable. Fixedly connected with the coupling half 142 is a disk 166 and on this there are mounted electrically insulating spacers 167 which in turn mount brush holders 168 for the brushes 117 which cooperate with the collector 116. Also mounted on the coupling half 142, axially spaced from one another, are two slip rings 155 and 156 which turn with the coupling half 142 and which are secured in a sleeve 154 which surrounds the actual coupling half 142 and is composed of an electrically insulating potting material such as is well known in the motor art. Respective bridges 169 provide electrically conductive connection between a respective one of the slip rings 155, 156 and one of the brushes 117 cooperating with the collector 116. The electrical connection of the motor to a source of direct current is effected by means of brushes which are stationarily mounted in brush holders 157, 158 which in turn are stationarily secured to the housing wall 135. Reference numerals 161 and 162 identify the conductors which supply electrical current to these brush holders 157, 158. The collector 116 of the commutator is electrically connected with the field windings 120 of the stator via conductors 170, analagous to the embodiment of FIG. 1; these conductors 170 are connected to the connector lamellae at 171 in known manner and passed through the housing wall 135 by means of vacuum-tight pass-throughs. The entire control part of the motor which is located outside the capsule 125, is surrounded by a protective hood 163 which is connected by means of a circumferentially extending sealing profile 164 to the capsule 125 in the region of the outer edge of the housing wall 135.

It can be seen that in both embodiments the essential purpose of the present invention is achieved, in that the sparking part of the motor is hermetically sealed and remote from the component to be driven but without requiring the transmission of the total motor torque via a coupling according to the prior art.

The invention has hereinbefore been described with respect to two exemplary embodiments. Various modifications will, however, offer themselves to those skilled in the art and are therefore intended to be encompassed within the scope of protection defined by the appended claims.

What is claimed is:

1. A direct-current motor particularly for driving compressors in refrigeration aggregates, comprising a housing; a stator in said housing; a rotor in said housing concentrically surrounded by said stator and defining an annular clearance therewith, said rotor including an output shaft; commutator means in said housing; a magnetic coupling in said housing intermediate said rotor and said commutator means for transmitting rotation to the latter, said coupling including two magnetically coupled discrete rotatable elements one of which is driven by said rotor and the other of which drives said commutator means; and means hermetically subdividing said housing into two compartments one of which contains said stator, rotor and one of said rotatable members whereas the other compartment contains said commutator means and the other of said rotatable elements; said output shaft extending through said subdividing means for said other compartment into direct driving connection with an aggregate to be driven, torque required for driving said commutator means being transmitted indirectly by said magnetic coupling.

2. A motor as defined in claim 1, said means for subdividing being a wall through which said coupling extends, and said rotatable elements defining with one another an air gap; and further comprising a partition located in said air gap and fluid-tightly connected to said wall.

3. A motor as defined in claim 2, said coupling being a radial magnetic coupling and said partition being a hood interposed between the magnetic poles of said rotatable elements.

4. A motor as defined in claim 2, said coupling including a casing rigidly connected to said wall and having a hollow pin projecting into said other compartment, said commutator means having a collector turnably mounted on said hollow pin.

5. A motor as defined in claim 3, said commutator means including a collector; and said coupling further including a journal pin immovably connected with said hood and journalling said other rotatable element and also mounting said collector.

6. A motor as defined in claim 5, said collector being non-rotatable and said commutator means further comprising commutator brushes in biased contact with said collector and mounted on said other rotatable element for rotation therewith relative to said collector; and further comprising slip rings mounted on said other rotatable element, and cooperating brushes stationarily mounted adjacent said slip rings for supplying electrical energy from a source to said motor.

7. A motor as defined in claim 6, said pin being hollow; said other rotatable element further comprising a shaft journalled in said hollow pin and rigidly connected with said other rotatable element; and where inset slip rings are mounted on said shaft for rotation therewith.

8. A motor as defined in claim 6, said slip rings being mounted on said other rotatable element and being spaced from one another in axial direction.

9. A motor as defined in claim 3, said rotor having main poles constituted by permanently excited magnets.

10. A motor as defined in claim 1, in combination with a compressor of a refrigeration system, and means operatively coupling the motor and the compressor so that the former drives the latter.

11. A motor as defined in claim 10, further comprising a hermetically sealed capsule accommodating said stator, rotor and compressor therewithin; and means mounting said commutator means outside said capsule.

12. A motor as defined in claim 10, said motor having a motor shaft; and wherein said compressor is located intermediate said rotor and stator on the one hand and said commutator means on the other hand.

13. A direct-current motor particularly for driving compressors in refrigeration aggregates, comprising a housing; a stator in said housing; a rotor in said housing concentrically surrounded by said stator and defining an annular clearance therewith, said rotor including an output shaft; commutator means in said housing; a magnetic coupling in said housing intermediate said rotor and said commutator means for transmitting rotation to the latter, said coupling including two magnetically coupled discrete rotatable elements one of which is driven by said rotor and the other of which drives said commutator means; and means hermetically subdividing said housing into two compartments one of which contains said stator, rotor and one of said rotatable members whereas the other compartment contains said commutator means and the other of said rotatable elements; said means for subdividing being a wall through which said coupling extends, and said rotatable elements defining with one another an air gap; a partition located in said air gap and fluid-tightly connected to said wall; said coupling being a radial magnetic coupling and said partition being a hood interposed between the magnetic poles of said rotatable elements; said commutator means including a collector; said coupling including a journal pin immovably connected with said hood and journalling said other rotatable element and also mounting said collector; said collector being non-rotatable and said commutator means further comprising commutator brushes in biased contact with said collector and mounted on said other rotatable element for rotation therewith relative to said collector; slip rings mounted on said other rotatable element, and cooperating brushes stationarily mounted adjacent said slip rings for supplying electrical energy from a source to said motor; said stator comprising field windings; electrical conductors connecting said field windings and said collector and extending through apertures in said hood; and means vacuum-tightly sealing said apertures.

* * * * *